United States Patent

[11] 3,577,656

[72] Inventor William H. Lyon
 Woodbridge, Conn.
[21] Appl. No. 817,803
[22] Filed Apr. 21, 1969
[45] Patented May 4, 1971
[73] Assignee KMS Industries, Inc.
 Ann Arbor, Mich.

[54] TEACHING APPARATUS
 20 Claims, 18 Drawing Figs.
[52] U.S. Cl........................................................ 35/9
 35/6
[51] Int. Cl.................................................. G09b 3/06
[50] Field of Search.......................................... 35/9, 6, 9.1

[56] References Cited
 UNITED STATES PATENTS
 Re23,030 8/1948 Holt............................... 35/9X
 1,749,226 3/1930 Pressey......................... 35/9

2,983,054 5/1961 Twyford, Jr.................. 35/9
 3,009,263 11/1961 Blain............................. 35/9
Primary Examiner—Wm. H. Grieb
Attorney—Walter Spruegel ABSTRACT: A teaching apparatus has a student-answer registering device including a number of individually manipulatable keys bearing different marks, with the device indicating a correct student answer on manipulation of any key the mark of which is in the order of the same key mark in a preassigned recurring sequence of successive manipulations of the keys, and the apparatus being adapted for use with successive cards or the like of which each card displays a problem question and as many answers thereto, including one correct one, as there are keys, with the answers on each card being marked the same as the keys, and the marks applied to the correct answers on successive cards conforming to the preassigned key mark sequence.

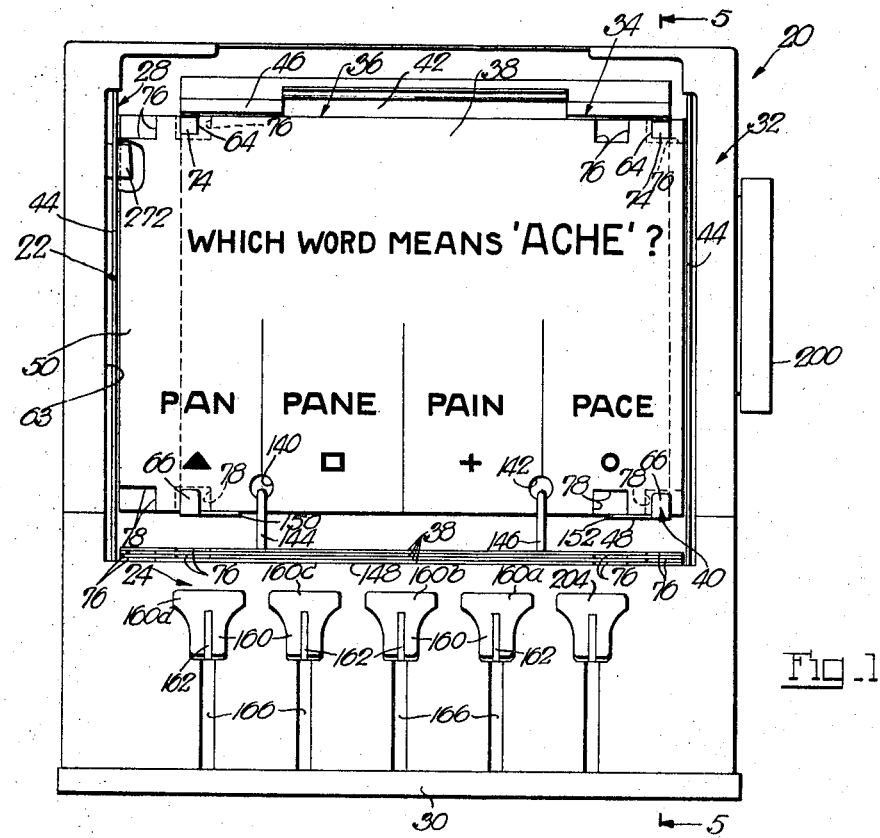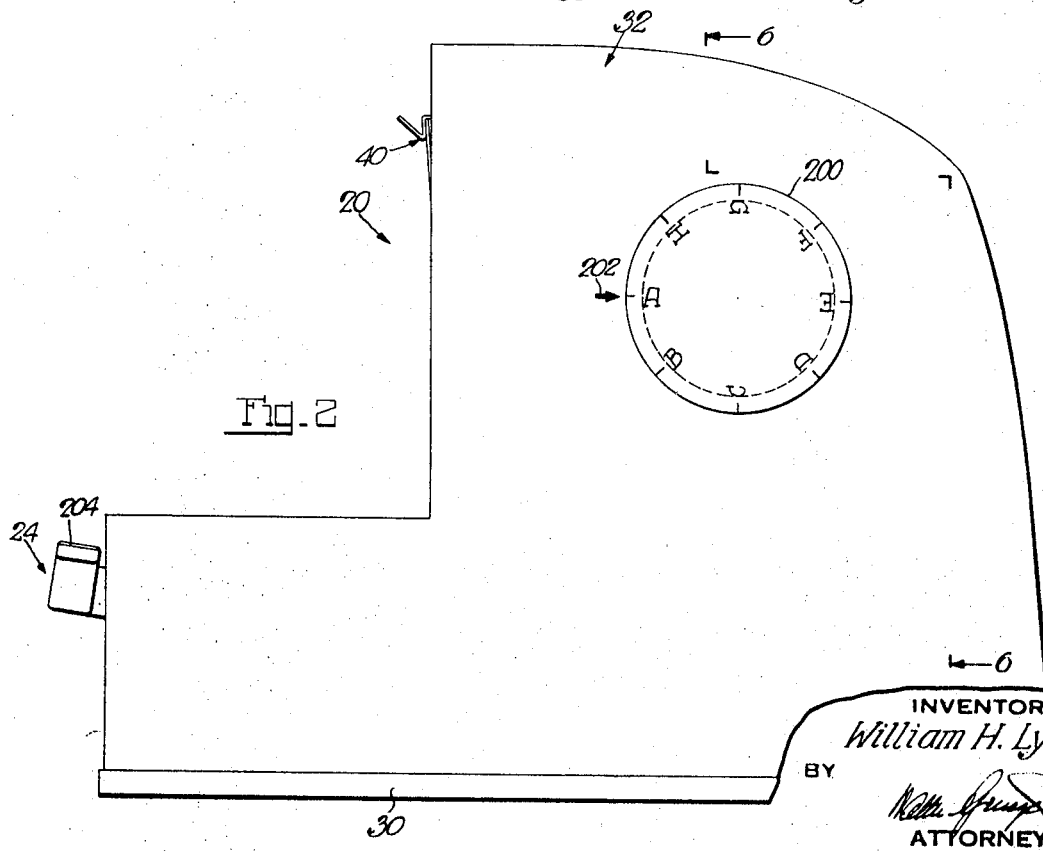

INVENTOR
William H. Lyon
BY
ATTORNEY

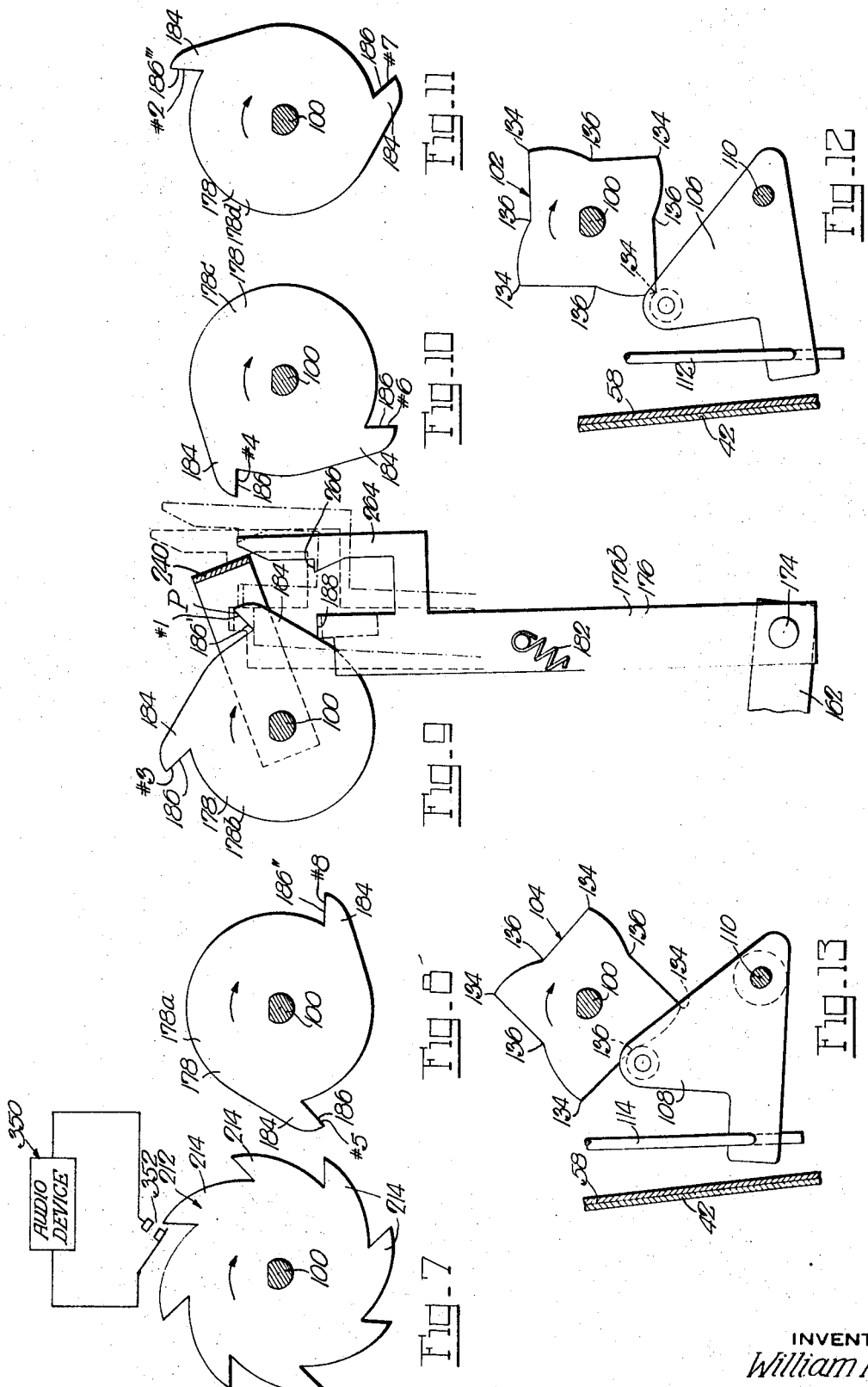

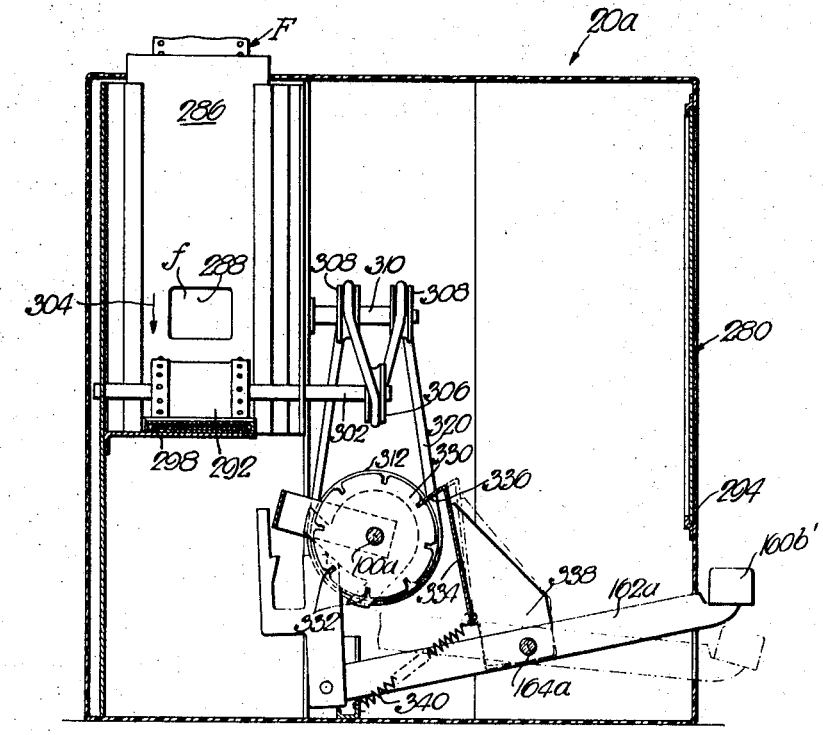
Fig. 18
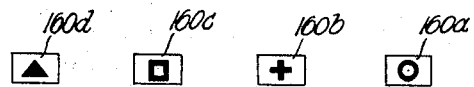
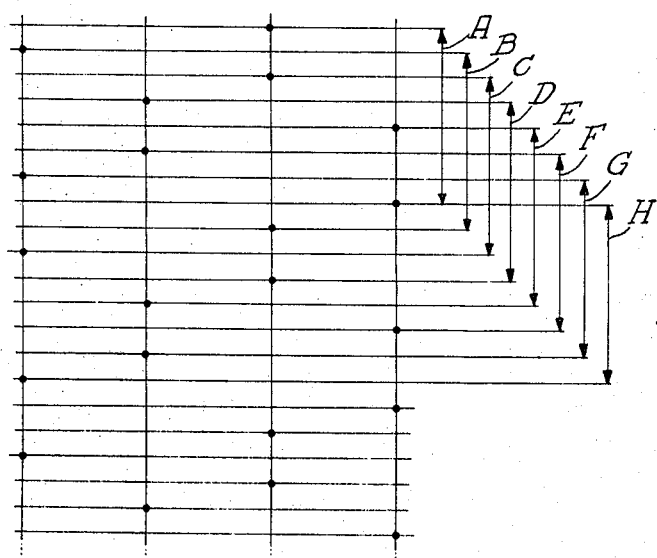
Fig. 15
INVENTOR
William H. Lyon

TEACHING APPARATUS

This invention relates to teaching apparatus in general, and to teaching apparatus of the question-and-answer kind in particular.

The present invention is concerned with the type of teaching apparatus employing cards or the like with problem questions, and having score mechanism selectively operable by a student to register his or her answers from an available list of answers, including only one correct one, to each question and to record the correctness or incorrectness of the registered answers.

It is among the objects of the present invention to provide teaching apparatus of this type in which a series of question cards or the like are insertable, and which has score mechanism with selectively operable "registration" keys which are individually associated with the answers on an available list of answers to the question on each card, and which on manipulation by a student register the associated listed answers, with successive ones of the cards being displayed for the student's consideration and answer selection only if the student's registered answer to the question on the preceding card is the correct one. With this arrangement, the student is immediately aware of the correctness or incorrectness of his or her registered answer to the question on any card by the ensuing display or lack of display, respectively, of the next card, and the student will on registration of any incorrect answer have the opportunity to again ponder the same question and register the correct answer or another incorrect answer.

It is another object of the present invention to provide teaching apparatus of this type which, in addition to giving the aforementioned immediate indication to the student of any registered correct or incorrect answer, also keeps visible and tamperproof score of the number of registered wrong answers to the questions on an entire series of inserted cards, thereby to permit grading of the student's effort by a supervisor and/or by the student himself or herself. To this end, the apparatus has a score mechanism which is actuated on each manipulation of a registration key that registers an incorrect answer.

It is a further object of the present invention to provide teaching apparatus of this type which has provisions, preferably an "index" key, for clearly marked student manipulation to cause display of the next card without prior registration of any student answer. With this arrangement, the apparatus is adaptable for insertable series of cards of which each series has an "explanatory" card or cards that bear explanations or instructions relative to a question or questions on a succeeding card or cards and, hence, require no student answer.

Another object of the present invention is to provide teaching apparatus of this type in which the aforementioned index key is also associated with the score mechanism so that on each manipulation of this index key the mechanism is actuated to score an incorrect answer. This arrangement introduces a unique feature in that a student not knowing the correct answer to the question on any particular card and scheming to avoid a possible incorrect answer score by not manipulating any of the registration keys and instead manipulating the index key, will not succeed in this because manipulation of the index key does entail an incorrect answer score. On the other hand, the true score of registered incorrect answers to all questions on the cards of a series including an explanatory card or cards is readily obtained by simply deducting from the indicated score the designated number of such explanatory cards.

A further object of the present invention is to arrange each series of cards intended for apparatus of this type so that each question card bears, besides a specific question, also the aforementioned listed answers, preferably more than two, to the specific question, and the apparatus is coordinated with the insertable card series by having as many answer registration keys as there are answers on each question card, and each of these registration keys is further coordinated with a particular answer on any displayed card so that on manipulation of any selected one of these keys the student registers the coordinated answer on the card which he or she believes to be the correct answer.

It is another object of the present invention to achieve the aforementioned coordination between the registration keys of the apparatus and the answers given on any displayed question card of an inserted card series by the simple expediency of marking the answers on each question card with distinguishing characters and marking the registration keys with the same distinguishing characters, with each registration key being marked with the same character as the answer on any card with which it is coordinated.

It is a further object of the present invention to provide teaching apparatus of this type which for display or nondisplay of successive cards pursuant to each prior student registration of a correct or incorrect answer, respectively, has as its primary operating elements a group of coaxial discs turnable in unison and being in number equal to the number of registration keys, of which each disc has a peripheral shoulder and all shoulders are equiangularly spaced from each other, with one shoulder being in a predetermined angular operating position, and there is associated with each registration key and a disc a pawl which on manipulation of the key is moved into register with the shoulder on the associated disc if that shoulder is in the predetermined angular operating position, and any pawl registering with the shoulder on the associated disc indexing all discs through one step equal to the distance between successive shoulders, with the next card being displayed on each indexing step of the discs. With this arrangement, a fixed sequence of manipulation of the registration keys for registering successive correct answers is built in the apparatus, with this sequence being as the chosen, i.e., programmed, sequence of the associated discs whose shoulders follow each other into the predetermined angular operating position. Therefore, the aforementioned distinguishing marks on the correct answers to questions on successive cards must not only follow each other in the same sequence as the same marks on the registration keys which on successive manipulation register successive correct answers, but must also be in step with the marks on these keys in the sense that on manipulation of any registration key with a particular mark for registration of a correct answer the registered answer will indeed conform to the identically marked, correct one of the answers to the question on the then displayed card.

Another object of the present invention is to provide teaching apparatus of this type in which the aforementioned sequence of manipulation of the registration keys for registration of successive correct answers, and with it the sequence of the marks on the correct answers on successive cards, is prolonged quite appreciably, by the simple expediency of providing the discs with an overall number of shoulders greater than the number of discs. With this arrangement, the sequence of key manipulation for successive correct-answer registrations, while recurring, may nevertheless be sufficiently prolonged to escape detection by most any student, and the same single key manipulation sequence may advantageously be built into all apparatus of this type for their simplified and low-cost production.

It is another object of the present invention to provide teaching apparatus of this type which visually indicates by different marks the manipulation of successive keys in the aforementioned sequence of key manipulations, whereby a sequence of key manipulations may be started at any of the indicated marks and thereby make it more than unlikely that a student will get wise to the sequence.

A further object of the present invention is to provide teaching apparatus of this type in which the peripheries of the aforementioned discs are between their shoulders formed as cams with which the associated pawls are in spring-urged follower relation, with these cams being designed so that for scoring a registered incorrect answer to a question on any displayed card, the pawl associated with the respective manipulated registration key will in its reciprocatory response be cammed into operative relation with and actuate the score mechanism, whereas on manipulation of any registration key for registration of a correct answer, the associated pawl will on its reciprocatory response be cammed not only into register with the next shoulder on the associated disc for indexing all discs, but also out of operative relation with the score mechanism.

It is another object of the present invention to provide teaching apparatus of this type in which its aforementioned response to indexing of the discs in displaying a next card is also used to the same end on manipulation of the aforementioned index key, by simply providing a ratchet wheel which is turnable with the discs and has as many evenly spaced teeth as there are shoulders on all discs, and an associated pawl which on each manipulation of the index key is reciprocated and cooperates with a tooth on the wheel to index the latter and with it all discs for a distance of one wheel tooth, with this pawl being on each reciprocation also brought into operative relation with the score mechanism to actuate the same for scoring each manipulation of the index key the same as a registered incorrect answer to a question on any displayed card.

It is a further object of the present invention to provide for teaching apparatus of this type insertable series of cards, of which the cards of each series are printed on at least one face and arranged, preferably stacked in a deck and bound, for turnover to bring the printed faces of successive cards into display, with the correct answers on successive cards to the questions thereon being marked identically and at the same sequence as the registration keys which on their successive manipulation register correct answers as programmed in the apparatus.

Another object of the present invention is to provide alternative teaching apparatus of this type which has all the aforementioned features in structure and performance, except that the questions and accompanying answers are provided, not on printed cards, but as screen-projected images of questions and accompanying answers on successive frames of film which is indexed one frame on manipulation of a correct-answer registration key or of the index key.

It is a further object of the present invention to provide teaching apparatus of this type for use with a deck of printed cards which by rings along one edge thereof are bound in looseleaf fashion, with the apparatus having a magazine with an open front facing the registration and index keys and receiving a deck of cards standing on their ring-bound edges and learning forward, so that the foremost card on display at the front of the magazine will drop out for display of the next card when a gate thereat is on manipulation of a correct-answer key or of the index key actuated to release the foremost card.

It is another object of the present invention to provide teaching apparatus of this type in which the aforementioned gate is in the form of lugs at the bottom and top of the open magazine front which retain inserted cards in the magazine and which for release of the foremost cards therefrom are reciprocated back and forth along the bottom and top edges of the latter into alternate card-release positions on successive manipulations of correct-answer registration keys or of the index key, with the cards in the inserted deck having in their bottom and top edges notches of which those in successive cards are out of alignment and those in alternate cards are in alignment, and all notches are coordinated with the card-retaining lugs so that the notches in successive cards are in alignment with these lugs in their alternate release positions. With this arrangement, and on further coordinating the notches in the cards with the apparatus so that on insertion of a new deck into the magazine with its designated top card foremost the deck is retained therein by the lugs when the device is then in condition to start a key sequence with a particular key, all the cards are in correct release coordination with the apparatus in that on manipulation of the correct-answer registration key or of the index key pursuant to any foremost card in the magazine the lugs will be shifted to their other card-release position in which they align with the notches in this foremost card and, hence, clear the latter for its dropout from the magazine.

A further object of the present invention is to provide teaching apparatus of this type in which a deck of cards is inserted in the magazine by simply passing the deck through the open magazine front, with the top ones of the card-retaining lugs thereat being to this end yieldable out of the path of the cards and preferably provided with inclined front faces by which they are cammed out of the way of the card deck on its pass into the magazine.

It is another object of the present invention to provide teaching apparatus of this type in which the aforementioned score mechanism responds to manipulation of a reset element in returning to 0 score indication, and this reset element is provided in the card magazine behind cards therein so as to be normally hidden and accessible for manipulation only when the magazine is empty. With this arrangement, tampering by a student with his or her indicated score of incorrect answers is impossible for some students and quite unlikely for other students.

It is a further object of the present invention to provide teaching apparatus of this type for alternative use with film as aforementioned, in which the film is indexed one frame by a sprocket which to this end is stepped by having a drive connection with an operating shaft carrying the aforementioned discs and ratchet wheel, with this drive connection including a friction coupling of which one of the companion members turns with the operating shaft and the other member is turnable with the film sprocket and also with a manual knob which on being turned drives the sprocket for bringing the designated first frame of an inserted film into correct image projecting register with the screen without, however, turning the operating shaft.

Another object of the present invention is to provide teaching apparatus of this type in which, on manipulation of the aforementioned knob for bringing the designated first frame of an inserted film into correct image projecting register with the screen, the operating shaft is positively locked against drive by the friction coupling, but this shaft is free to turn and thereby step the film sprocket through the friction coupling on manipulation of any correct-answer registration key or of the index key.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a front view of teaching apparatus embodying the present invention;

FIG. 2 is a side view of the apparatus;

FIGS. 7 to 11 are enlarged sections through the apparatus taken on the lines 7–7 to 11–11, respectively, of FIG. 6;

Figure 14:
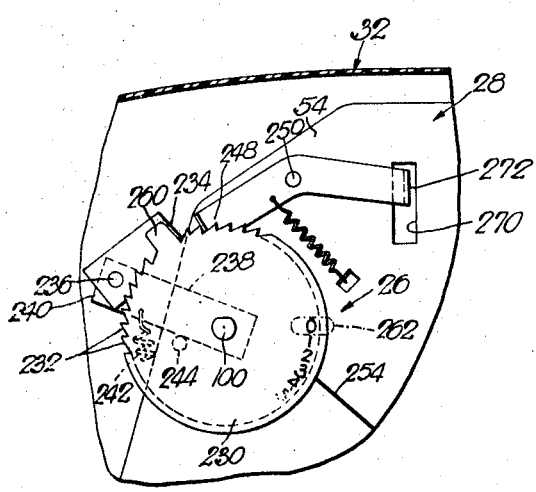
Figure 6:
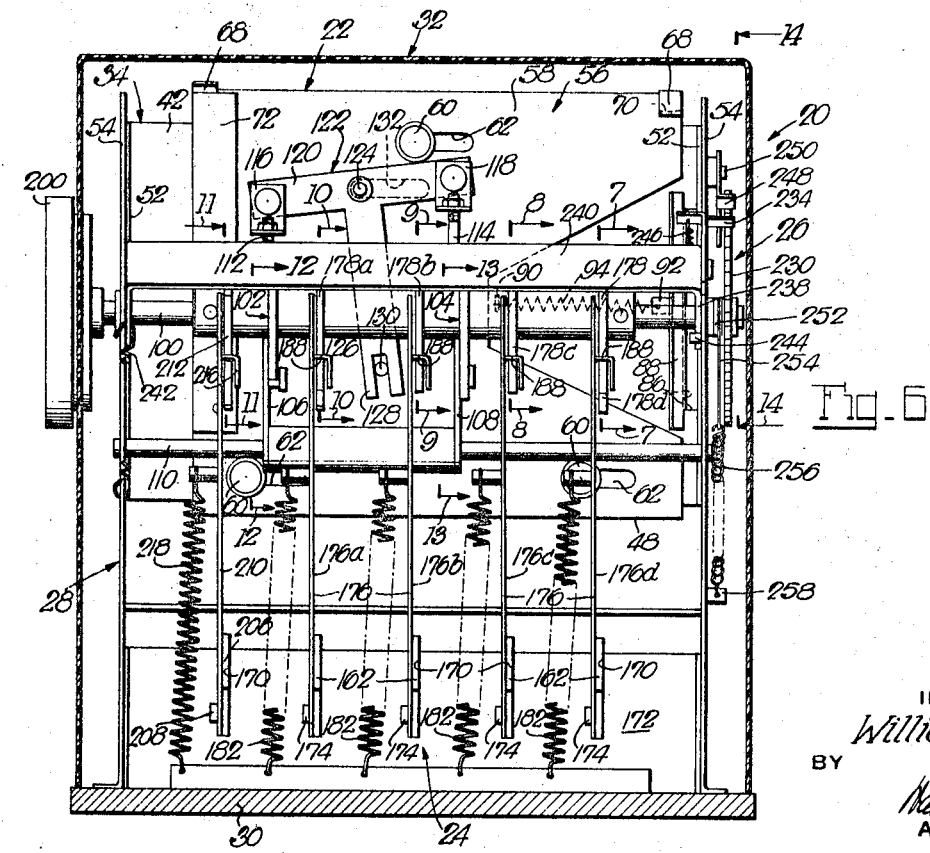
FIG. 6 is a section through the apparatus taken substantially on the line 6–6 of FIG. 2.
Figure 16:
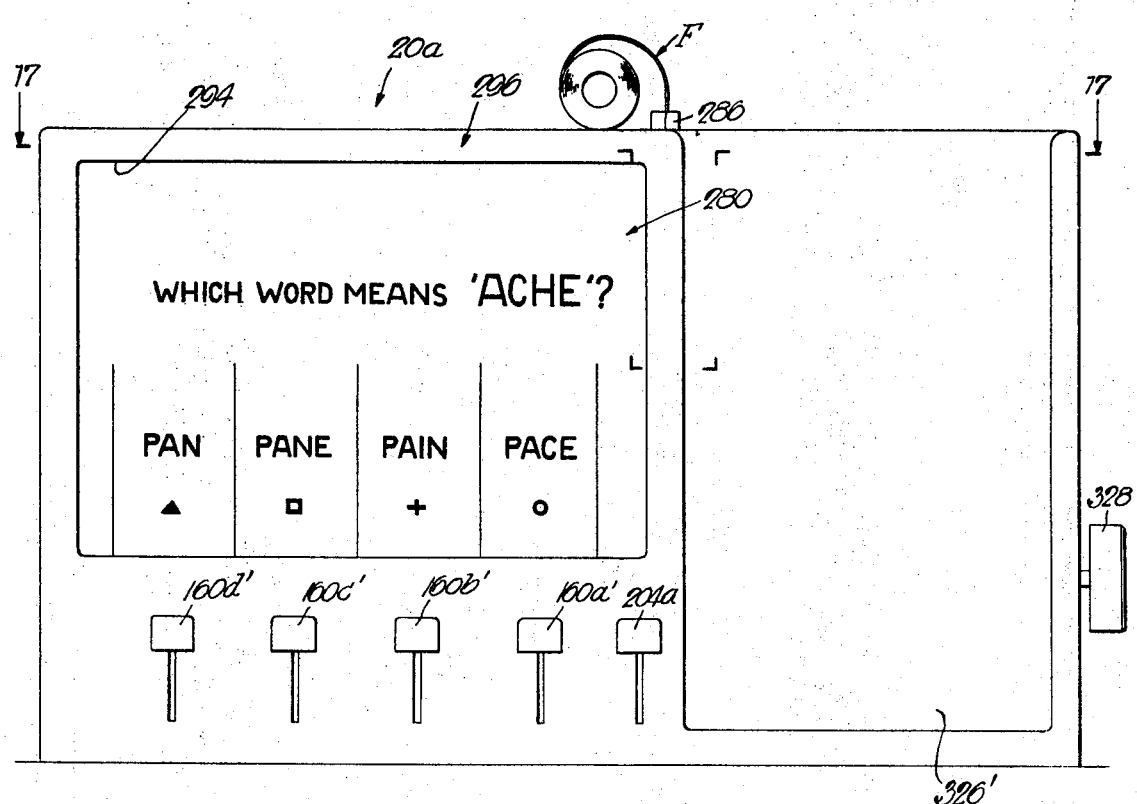
Figure 17:
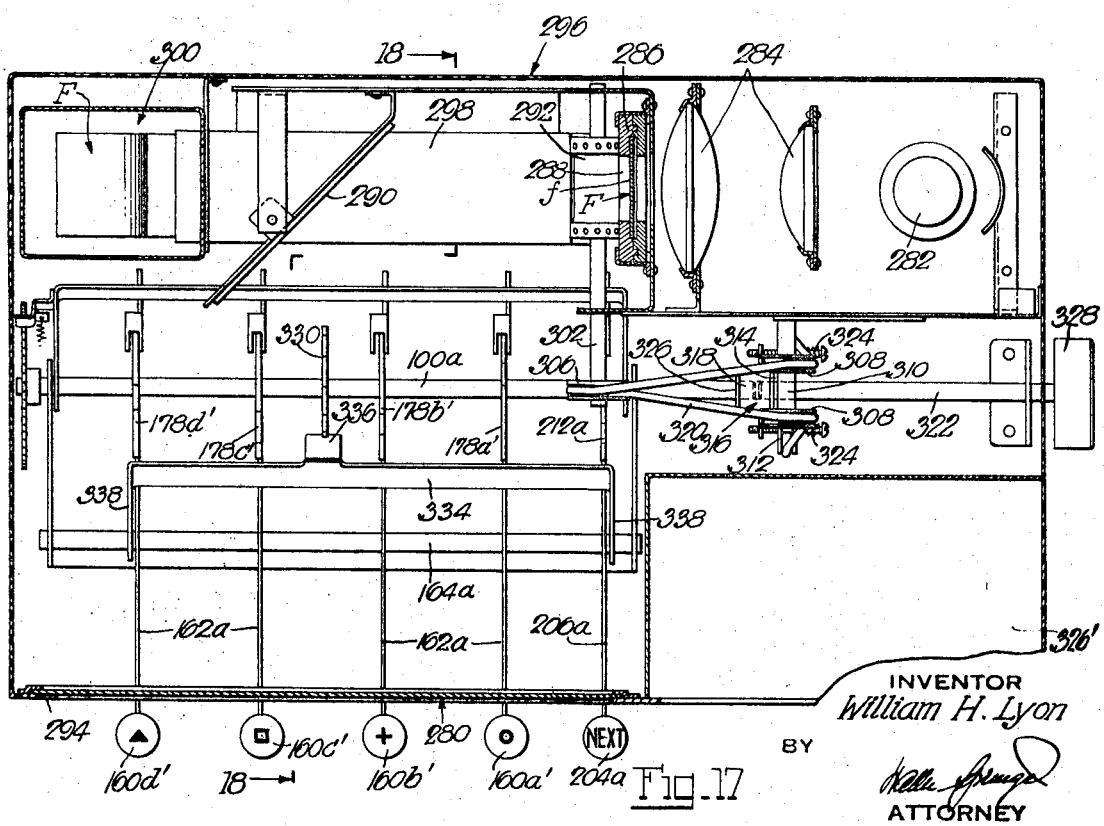

FIGS. 12 and 13 are enlarged sections taken on the lines 12–12 and 13–13, respectively, of FIG. 6;

FIG. 14 is a fragmentary section through the apparatus taken on the line 14–14 of FIG. 6;

FIG. 15 is a chart indicating certain preassigned sequential operability of the apparatus;

FIG. 16 is a front view of teaching apparatus embodying the invention in a modified manner;

FIG. 17 is a section through the modified apparatus taken substantially on the line 17–17 of FIG. 16; and FIG. 18 is a section through the modified apparatus taken substantially on the line 18–18 of FIG. 17.

Referring to the drawings, and more particularly to FIGS. 1 to 6 thereof, the reference numeral 20 designates teaching apparatus which as its main operating components has a question-and-answer display unit 22, an answer registration device 24, and answer scoring mechanism 26, which are provided on a frame 28 on a base 30, with the frame 28 being enclosed in a cover 32.

QUESTION-AND-ANSWER DISPLAY UNIT

Figure 5:
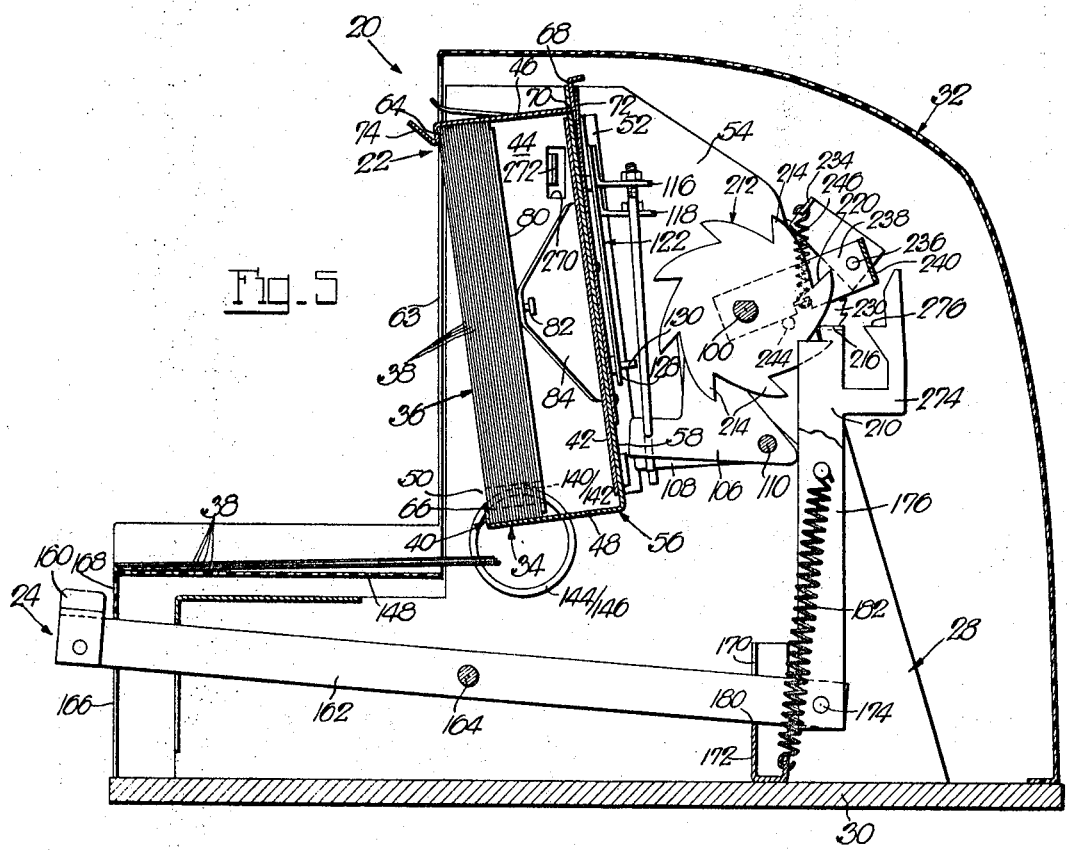
FIG. 5 is a section through the apparatus taken substantially on the line 5–5 of FIG. 1.

This unit 22 provides a magazine 34 adapted for reception of a series of question-and-answer elements in the exemplary form of a deck 36 of printed cards 38, a gate 40 normally retaining the cards in the magazine, and means to operate the gate for discharge of successive cards from the magazine. The magazine 34 has a rear wall 42, opposite sidewalls 44, top and bottom walls 46 and 48 and an open front 50, of which the rear wall 42 is by end flanges 52 secured to opposite end walls 54 of the frame 28 which also serve as the sidewalls 44 of the magazine (FIGS. 5 and 6), while the top and bottom walls 46 and 48 are part of a slide 56 having behind the rear magazine wall 42 a rear plate 58 from which the walls 46 and 48 project forwardly and with which they slide for a purpose hereinafter described. The slide 56 is guided for movement back-and-forth longitudinally of the magazine, i.e., horizontally in this instance, by headed studs 60 which extend from the rear magazine wall 42 through slots 62 in the rear plate 58 of the slide (FIG. 6). The card deck 36 stands edgewise on the bottom wall 48 of the magazine 34, with the foremost card in the deck at the open magazine front 50 being displayed through a window 63 in the cover 32, and the card deck being retained in the magazine by inwardly projecting top and bottom lugs 64 and 66 on the top and bottom walls 46 and 48 thereof which also are parts of the slide 56 (FIGS. 1 and 5).

For ready insertion of a card deck 36 into the magazine 34 through the open front 50 thereof, the top lugs 64 are yieldable out of the path of the deck on its pass through the open magazine front. To this end, the top magazine wall 46 with the top lugs 64 is hingedly connected with the rear plate 58 of the slide 56, by having spaced tongues 68 which extend through hinge slots 70 in the rear plate 58 and are locked therein by being bent against the latter (FIGS. 5 and 6), with a leaf spring 72 on the rear plate 58 engaging one of these tongues 68 for normally urging the wall 46 with its lugs 64 into the position illustrated in FIG. 5 in which the lugs 64 and 66 retain the foremost card of an inserted deck, and with it the entire deck, in the magazine. Thus, while the top wall 46 with its lugs 64 is hinged to the rear plate 58 of the slide 56, it remains movable with the latter in the described guided horizontal direction. The lugs 64 on the hinged top wall 46 are also provided with inclined forward extensions 74 which by a card deck being passed into the magazine through the open front thereof are cammed out of the way, as will be readily understood. As already mentioned, the cards stand edgewise in the magazine, and by arrangement of the top and bottom lugs 64 and 66 the cards also lean forward so that only the top lugs 64 prevent their dropout from the magazine (FIG. 5).

The top and bottom lugs 64 and 66 form the gate 40 which retains the cards in the magazine, and for operability of this gate for discharge of successive cards from the magazine, the top and bottom lugs are provided on the slide 56, as described, for their movability into opposite card-release positions. However, for card-release performance of the gate, provisions are also made on the cards themselves to cooperate with the gate in its card-release performance. To this end, the cards are in their top and bottom edges provided with top and bottom notches 76 and 78 of which those in successive cards are out of alignment and those in alternate cards are in alignment (FIGS. 1 and 4), with these notches being also coordinated with the gate 40 so that the notches in alternate cards are in alignment with the lugs 64 and 66 in their opposite card-release positions, respectively. Additionally, the notches 76 and 78 in the foremost card of a deck must, on insertion of the latter into the magazine, be out of alignment with the lugs 64 and 66 in the card-release position which they then assume. This latter condition is demonstrated in FIG. 1 in which the notches 76, 78 in the foremost card are out of alignment with the lugs 64, 66 in the illustrated card-release position, wherefore these lugs then retain this foremost card in the magazine. However, on shifting the lugs 64, 66 to their other card-release position shown in FIG. 4, these lugs align with the notches 76, 78 to permit dropout of the foremost card from the magazine but retain the next card in the magazine until released for dropout on the next shift of the lugs 64, 66 to the opposite card-release position (FIG. 1), as will be readily understood. Accordingly, successive foremost cards in the magazine are released for dropout therefrom on successive shifts of the lugs 64, 66 into their opposite card-release positions until all cards have dropped out.

The cards in the magazine are preferably spring-urged against the lugs 64, 66 by the follower plate 80 (FIG. 5) which at 82 has a loose pivot connection with an arm 84 that extends through a slot 86 in the rear magazine wall 42 and is held with pivotal freedom therein by a rear flange 88 (FIG. 6). Anchored to lugs 90 and 92 on the rear magazine wall 42 and on the rear flange 88 of the arm 84 are the ends of a preloaded spring 94 which urges the follower plate 80 toward the magazine front.

For operating the slide 56 to bring its lugs 64, 66 into the opposite card-release positions (FIGS. 1 and 4), there is provided an operating shaft 100 and an operating connection between this shaft and the slide 56. The shaft 100, which is suitably journaled in the end walls 54 of the frame 28, carries two cams 102 and 104 (FIGS. 6, 12 and 13) with which cooperate followers 106 and 108 that are turnable on a fixed shaft 110 in the frame 28. The followers 106 and 108 are through links 112 and 114 connected with pivoted angle brackets 116 and 118 on the opposite ends of the crossarm 120 of a T-lever 122 which at 124 is pivoted to the rear magazine wall 42, and which has another arm 126 with a forked end 128 receiving a rearwardly projecting pin 130 on the rear plate 58 of the slide 56 (FIGS. 5 and 6). The mounting pin 124 for the T-lever 122 projects rearwardly from the rear magazine wall 42 and extends through a clearance slot 132 in the rear plate 58 of the slide 56 so as not to interfere with the operational movements of the latter. The cams 102 and 104 are identical, each having in this instance eight equiangularly spaced, alternating high and low points 134 and 136, and the two cams are angularly displaced 45° from each other so that a high point 134 of one cam engages its associated follower when a low point 136 of the other cam engages the associated follower, and vice versa (FIGS. 12 and 13). Thus, in the angular position of the cams 102 and 104 shown in FIGS. 12 and 13, the T-lever 122 is in the angular position shown in FIG. 6 in which the slide 56 is with its lugs 64, 66 in the card-release position shown in FIG. 4. On next indexing the shaft 100 through 45° in exemplary clockwise direction (FIGS. 12 and 13) the T-lever 122 will be rocked to its opposite position to shift the slide 56 with its lugs 64, 66 into the next card-release position shown in FIG. 1. The slide 56 is thus shifted back and forth between the two card-release positions on successive indexing steps of the shaft 100 through 45°. The provisions for successively indexing the shaft 100 also form part of the answer registration device 24 and will be described later.

Each insertable card deck is preferably bound not only to hold the cards thereof in their prearranged succession but also to avoid the loss of any card. To this end, the cards 38 in the exemplary deck 36 are provided with aligned holes 140 and 142 along the edge on which they stand in the magazine, i.e., their bottom edge, and rings 144 and 146 extend through the respective aligned holes 140 and 142 to bind the cards in looseleaf fashion. The rings 144 and 146 in the inserted card deck 36 freely depend therefrom and act as hinges to guide released cards into orderly superposition on a ledge 148 on the cover 32 (FIG. 5), with the bottom wall 48 of the slide 56, being also the bottom wall of the magazine, being interrupted at 150 and 152 to provide clearance for the rings 144 and 146 (FIG. 1).

ANSWER REGISTRATION DEVICE

Figure 4:
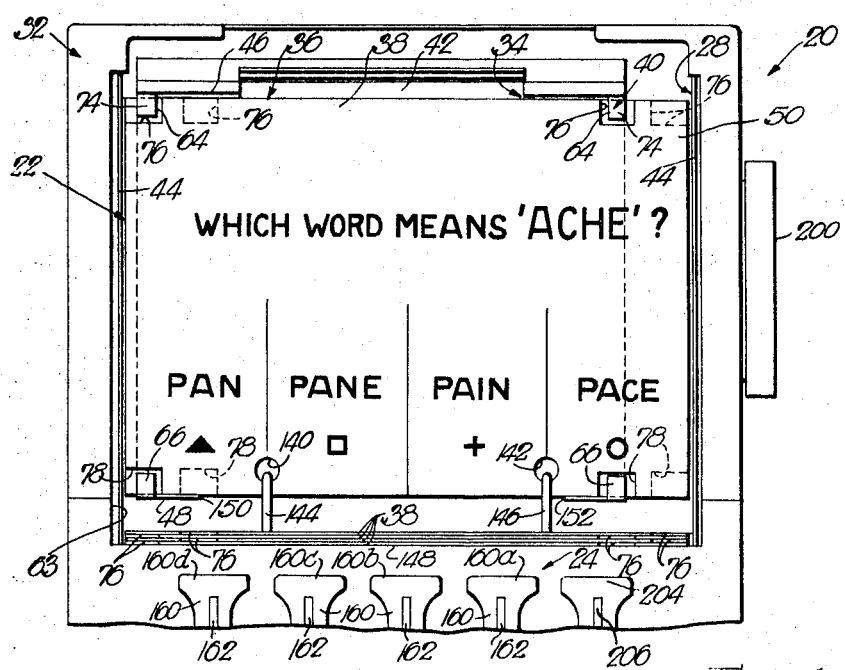
FIG. 4 is a fragmentary front view of the apparatus in a different operating condition than in FIG. 1.

The answer registration device 24 is adapted to register the answer a student selects as the correct one from a number of given answers to a problem question on each displayed card in an inserted deck in the magazine, of which the given answers to each question include only one correct one. Thus, the correct answer to the question on the exemplary displayed card in FIGS. 1 and 4 is PAIN and the other given answers are obviously wrong, wherefore a student knowing the correct answer will register PAIN as his or her chosen answer. All "question" cards in the deck, i.e., cards other than possible explanatory or introductory cards, present different problem questions with the same number of answers thereto, in this instance four, of which only one answer in each number of answers is the correct one. All of these question cards are of the same general format as the exemplary displayed card in FIGS. 1 and 4 in the relative location of the answers to each other and to the associated problem question, i.e., the answers on successive cards are in this instance provided below the respective questions and are preferably arranged in superposed rows so that the answers on successive displayed cards appear in the same location and order from left to right as the answers shown in FIGS. 1 and 4. Further, the answers on each card are provided with individually distinguishing marks, and the distinguishing marks on the answers on all cards are the same, with like marks being preferably applied to the answers on all cards which are of the same order in the respective rows of answers. Thus, with the exemplary distinguishing marks of the answers on the displayed card in FIG. 1 being a "triangle" mark, a "square" mark, a "cross" mark, and a "circle" mark for the four answers, the answers on all cards are provided with these same marks, with the leftmost questions on all cards preferably bearing the same triangle mark (FIG. 1) and the other questions bearing the other marks in the same order in which they appear in FIG. 1.

The answer registration device includes as many individually manipulatable keys 160 as there are answers to the question on each card, i.e., four in the given example. These keys 160 are provided on levers 162 which are turnable on a fixed shaft 164 in the frame 28 (FIG. 5), with these levers 162 extending through slots 166 in the front wall 168 of the cover 32 and carrying in front of the latter the respective keys 160, and these same levers also extending through slots 170 in a rear channel 172 in the frame 28. The rear end of each of these levers 162 is at 174 pivotally connected with a pawl 176 which cooperates with a disc 178 on the shaft 100 (FIGS. 5, 6 and 8 to 11) this being the shaft which also carries the described cams 102 and 104 for operating the slide 56. The levers 162 are, by springs 182 acting on their associated pawls 176, normally urged into the position shown in FIG. 5 in which they bear against the bottom walls 180 of the slots 170 in the channel 172 through which they extend, so that the keys 160 are normally in the raised position shown in FIGS. 1, 4 and 5, and may be individually depressed for operation of their associated pawls 176.

Each of the discs 178 on the shaft 100 has at least one, and preferably more than one, peripheral tooth 184 each with a shoulder 186, of which the shoulders of the teeth of all discs are equiangularly spaced. In the present example, there are four of these discs 178, one for each associated key 160 and pawl 176, and each disc has an exemplary number of two shoulders. Each pawl 176 is provided at its upper end with a hook formation 188 with which the pawl is by the associated spring 182 urged into following engagement with the periphery of the associated disc 178 (FIGS. 6 and 9).

Figure 3:
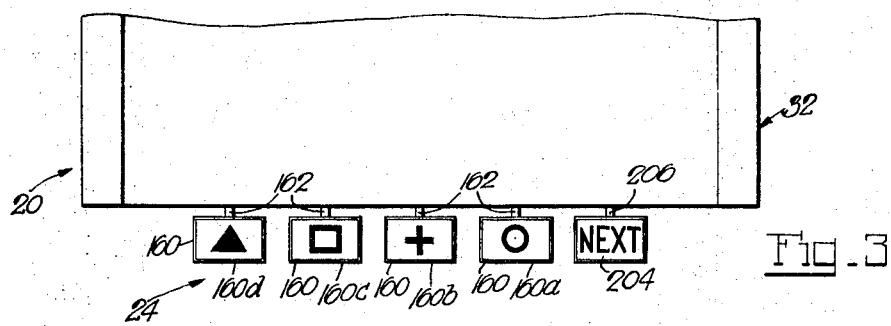
FIG. 3 is a fragmentary top view of the apparatus.

Like discs 178 in FIGS. 6 and 8 to 11 are identified as discs 178a to 178d and their associated pawls 176 are similarly identified as pawls 176a to 176d, and the keys associated with the respective pawls 176a to 176d and respective discs 178a and 178d are identified as keys 160a to 160d (FIGS. 1, 3 and 4). As shown in FIG. 3, the keys 160 also bear the same distinguishing marks as the answers on each displayed card, whereby each key 160 is by its mark associated with the answer of the same mark on all displayed cards. The different marks on the keys preferably also follow each other from the left end key 160d to the right end key 160a in the same order in which the same marks follow each other on the answers on the displayed card (FIGS. 3 and 4), thereby facilitating visual association of the answers with the similarly marked keys.

As already mentioned, the shaft 100 with the cams 102, 104 and the discs 178a to 178d thereon is to be indexed one step for each operation of the slide 56 with its lugs 64, 66 to release the foremost card from the magazine front and display the next card thereat. Each such indexing of the shaft 100 is achieved on depression of a certain one among the keys 160 through cooperation of the associated pawl 176 and disc 178, with successive indexing steps of this shaft 100 being achieved on depression of successive keys in a preassigned sequence to be described. In nondepressed condition of the keys 160 all pawls 176 are at the level of the pawl 176b shown in full lines in FIG. 9, and each pawl is on depression of its associated key raised to the level of the key 176b in its dotted line position in FIG. 9. Further, the discs 178 are so coordinated with their associated pawls that only one shoulder 186 among all shoulders on the discs is in an "operating" position for indexing cooperation with the associated pawl on depression of the associated key, and this shoulder is in this instance the shoulder 186' on the disc 178b in the angular operating position P in FIG. 9. Thus, on depressing the associated key 160b, pawl 176b will be raised to its dotted line position (FIG. 9) in which the associated spring 182 swings this pawl with its hook formation 188 over the shoulder 186', whereby on release of the depressed key 160b and ensuing spring-return of the pawl 176b to its lower full-line position, disc 178b, and with it the shaft 100 and all discs thereon, will be indexed one step, clockwise as viewed in FIGS. 5 and 8 to 11, with the indexing step being equal to the angular distance between successive shoulders on the discs, i.e., 45° in conformity with the described 45° stepping of the cams 102 and 104 for release of each forward card from the magazine front and display of the next card thereat. In thus indexing the disc 178b at its shoulder 186', the latter will on spring-return of the associated pawl 176b to its lower, full-line, position (FIG. 9) arrive at an angular position like that of the shoulder 186" on the disc 178a in FIG. 8, and the shoulders on all discs will advance clockwise one step of 45°, with a next shoulder 186 then also arriving at the angular operating position P, this being in the present instance the shoulder 186''' on the disc 178d (FIG. 11).

It follows from the proceeding that in the particular angular rest position between steps of the shaft 100 and discs 178 thereon as shown in FIGS. 8 to 11, only depression of the key 160b and ensuing cooperation between the associated pawl 176b and disc 178b will bring about an index step of the shaft and discs, and that depression of any other key will not index the same. Also, while under these circumstances depression of the key 160b will result in discharge of the foremost card from the magazine, this being the one shown in FIGS. 1 and 4, and display of the next card, depression of this particular key 160b also denotes that the student selecting this key for depression thereby registers among the given answers to the question on the displayed card the one answer which he or she believes to be the right one. Thus, with the student selecting among the given answers to the question on the then displayed card (FIG. 1) the PAIN answer as the correct one, the student proceeded to register his or her selected answer by depressing the key which bears the same mark as the selected answer on the card, with this mark being in this instance the cross mark (FIGS. 3 and 4). Accordingly, since depression of the key 160b in this instance does bring about discharge of the displayed card from the magazine front and display of the next card thereat, this also confirms to the student that the answer he or she selected from the given answers as the correct one and so registered the same by depressing this particular key, was indeed the correct answer.

As already pointed out, depression of the key 160b will cause indexing of the shaft 100 and discs 178 thereon from the position in FIGS. 8 to 11 through one step at the end of which the shoulder 186''' on disc 178d will be in the angular operating position P. Accordingly, with the shoulder 186''' on the disc 178d being then in this operating position P, only depression of the associated key 160d will bring about the next indexing step of the shaft 100 and discs 178 thereon, and with this key 160d bearing the exemplary triangle mark (FIG. 3), the one answer among the four given answers to the question on the then displayed card which bears the same triangle mark must be the correct answer. Of course, the marks of the answers on the cards in the inserted deck are so arranged that this will be the case.

It will now be understood that the shaft 100 with the discs 178 and cams 102, 104 will be indexed successively on successive depressions of the keys 160 in a certain sequence which is the same as the programmed sequence of the respective discs 178 whose shoulders 186 follow each other into the angular operating position P. Thus, the order in which the shoulders 186 on the discs 178 follow each other into the operating position P is indicated by successive numbers 1 to 8 in FIGS. 8 to 11, with the shoulder 186' in the operating position P (FIG. 9) being in this instance marked as the number 1 shoulder. Accordingly, the sequence of the discs whose shoulders follow each other into the operating position P is disc 178b—disc 178d—disc 178b—disc 178c—disc 178a—disc 178c, disc 178d—disc 178a, wherefore the sequence of the keys which on successive depression cause successive indexing steps of the shaft 100 and discs and cams thereon, being as the sequence of their associated discs, is key 160b—key 160d—key 160b—key 160c—key 160a—key 160c—key 160d—key 160a. This key sequence, which starts with the key 160b, is graphically illustrated in FIG. 15 as the sequence A, with the order of the keys in this sequence being noted by the dots below the respective indicated, marked keys 160a to 160d. Thus, assuming that the exemplary displayed card in FIG. 1 is the topmost card of an inserted deck, successive depressions of the keys in this and each recurring sequence, starting with the key 160b, will bring about the discharge of successive cards from the magazine front and display of the next cards thereat until all cards are discharged, provided the marks on the given correct answers to questions on successive displayed cards are arranged, as they must be, to follow each other as the same marks on the keys being successively depressed in the sequence.

Assuming that the marked answers on the cards of any insertable deck are coordinated to require for correct-answer registration depression of the keys in the sequence A starting with key 160b, the discs 178 on the shaft 100 must at insertion of any card deck be in the corresponding angular sequence-start position in FIGS. 8 to 11. Of course, the number of cards in any deck will be selected so that on discharge of the last card from the magazine the discs 178 will be in this sequence-start position. However, to afford visual indication of the sequence-start position of the discs and also manual turning of the discs into their sequence-start position if need be, the shaft 100 carries on the outside of the cover 32 a knob 200 (FIGS. 1, 2 and 6) having a marking, in this instance identified by the character A, and there is provided on the cover 32 a fixed pointer 202 (FIG. 2), with these being coordinated so that the discs 178 are in their sequence-start position when the A line on the knob is in alignment with the pointer 202. Should the discs 178 be returned from any other angular position to their sequence-start position, the knob 200 may be turned, clockwise as in FIG. 2, until the A line aligns with the pointer 202. Manual turning of the knob 200 in this fashion will result in like clockwise turning of the discs 178 (FIGS. 8 to 11), with the pawls 176 simply overriding the disc shoulders 186, as will be readily understood.

Preferably, the knob 200 has as many equiangularly spaced line marks as there are shoulders on the discs, with these line marks being identified by the successive characters A to H, and successive ones of these line marks denoting the order of the shoulders in the sequence in which they follow each other into the angular operating position P. With this arrangement, the sequence of successive depressions of the keys 160 for successive correct-answer registrations and ensuing discharge of successive cards from and display of the next cards at the magazine front, may be made to start with the denoted order of any shoulder, by simply turning the knob 200 to bring the corresponding line mark thereon into alignment with the pointer 202. There are thus available as many sequence-start positions of the discs 178 as there are shoulders 186 on the discs. The sequences of successive correct-answer depressions of the keys corresponding to the different sequence-start positions of the discs are also indicated in FIG. 15 by the groups of dots identified by the characters A to H. By changing the sequence-start positions of the discs for different decks of cards, the chances that a student may get wise to the key sequence in any given case are virtually nil. Further, it is exceedingly simple to coordinate the cards of any deck with the key sequence pursuant to any sequence-start position of the discs, by providing the given correct answer to the question on the first card with the same mark as that on the key with which to start the key sequence for correct-answer registrations.

To permit the use with the teaching apparatus of card decks having among question cards also other cards requiring no student answer, such as an introductory top card or one or more intermediate cards bearing instructions or explanations relative to a succeeding question card or cards, there is provided, in addition to the answer "registration" keys 160, another key 204, i.e., an "index" key, which is operatively connected with the shaft 100 and manipulatable to index the latter and the discs 178 and cams 102, 104 thereon through one regular step. This index key 204, which is in this instance marked NEXT (FIG. 3), is carried by a lever 206 (FIG. 6) which is turnable on the shaft 164 the same as the levers 162 (FIG. 5), and at its rear end pivotally carries at 208 a pawl 210 (FIGS. 5 and 6) which cooperates with a ratchet wheel 212 having as many peripheral teeth 214 as there are shoulders on the discs 178, i.e., eight in this instance. The pawl 210 has at its upper end a hook formation 216 with which it is normally urged against the periphery of the ratchet wheel 212 by a pawl-return spring 218 which normally urges the pawl into the retracted position in FIG. 5 in which the index key 204 is in its raised position (FIGS. 1, 2 and 4) in which it is depressible downwardly for its manipulation. In thus depressing the index key 204, the pawl 210 is raised to a point where the same is by its return spring 218 rocked with its hook formation 216 into register with the shoulder 220 of the nearest tooth (FIG. 5), whereby on release of the depressed index key 204 the pawl 210 is spring-returned to its inoperative position in FIG. 5 and indexes the ratchet wheel 212, and with it the shaft 100 and discs 178 and cams 102, 104 thereon, through one regular step. In consequence, the foremost displayed card at the magazine front will be discharged and the next card displayed thereat without manipulation of any registration key 160. Of course, since the ratchet wheel 212 has as many teeth 214 as there are shoulders on the discs 178, the foremost card at the magazine front will be discharged and the next card displayed thereat on each depression of the index key 204. Also, since each depression of the index key 204 results in an indexing step of the shaft 100 and discs 178 thereon, it stands to reason that this has to be taken into account in providing the given correct answers on successive question cards with the correct distinguishing marks so that on their registration by a student with registration keys of the same marks the registered answers indeed conform to the given correct answers.

ANSWER SCORING MECHANISM

Provisions are also made to score the number of registered incorrect student answers to the questions on the cards of an inserted deck. To this end, there is freely turnable on the shaft 100 a ratchet disc 230 (FIGS. 6 and 14) with the teeth 232 of which cooperates an indexing pawl 234 that is at 236 pivotally carried by one of the end legs 238 of a U-shaped bar 240. This bar 240 is with its legs 238 freely turnable on the shaft 100, and is normally urged by a spring 242 against a stop pin 244 on one of the end walls 54 of the frame 28 (FIGS. 5, 6 and 14), while the pawl 234 is by a spring 246 held against the ratchet disc 230. Also cooperating with the teeth of the ratchet disc 230 is a spring-urged holding pawl 248 which at 250 is pivotally mounted on one of the end walls 54 of the frame 28. Secured with one end to, and wound on, the hub 252 of the ratchet disc 230 is a flexible cable 254 the other end of which is anchored to one end of a tensioned spring 256 which is with its other end anchored to a lug 258 on the frame 28 (FIG. 6) with this spring normally urging the ratchet disc 230 clockwise into the score start position in FIG. 14 in which a peripheral lug 260 on the disc bears against the indexing pawl 234. The ratchet disc 230 is in its outer face provided with equiangularly spaced successive score numbers starting with 0 of which the 0 number registers with a window 262 in the cover 32 when the ratchet disc is in its score start position.

Each of the pawls 176 associated with the respective registration keys 160 has near its top a rear leg 264 with a shoulder 266 (FIG. 9). For scoring each registered incorrect student answer, the shoulder 266 on the pawl 176 which responds in rising to the depression of the wrong selected registration key 160 will engage the bar 240 and rock the same against its spring 242 clockwise as viewed in FIG. 14, sufficiently to bring the indexing pawl 234 into register with the next tooth of the ratchet disc 230, whereby on release of the depressed registration key 160 and ensuing spring-return of the bar 240 against the stop pin 244, the also returning indexing pawl 234 will take the ratchet disc 230 along for one tooth, i.e., one indexing step, in counterclockwise direction (FIG. 14) to bring the next score number on this disc into register with the window 262. Conversely, on registering any correct student answer, as on depressing the key 160b in the exemplary angular position of the discs 178 in FIGS. 8 to 11, the ratchet disc 230 is not indexed, because on the ensuing rise of the associated pawl 176b from its full-line position to its dotted line position (FIG. 9), the flank 268 of the tooth 184 whose shoulder 186' is then in the operating position P serves to cam this pawl with its shoulder 266 out of operative relation with the bar 240 as shown in the momentary dot-and-dash line position of this pawl in FIG. 9. On the other hand, and still with reference to the angular position of the discs 178 in FIGS. 8 to 11, on depression of any registration key 160 other than key 160b, the associated pawl 176 will on its ensuing rise be in follower relation with a circular part of the periphery of the associated disc 178 and thereby guided with its shoulder 266 into operative engagement with the bar 240 to index the ratchet disc 230 one step and thereby score a registered incorrect student answer, as will be readily understood.

To prevent a student from tampering with the score of registered incorrect answers at least until all cards of an inserted deck have been dealt with by the student and discharged from the magazine, the holding pawl 248 extends through an opening 270 in one of the sidewalls 44 of the magazine and has in the latter behind any inserted card deck therein a handle end 272 (FIGS. 1, 5 and 14) which only in the absence of any card in the magazine is accessible through the open magazine front for manipulation to release this pawl 248 from the ratchet disc 230 and permit spring-return of the latter to its score start position (FIG. 14).

Provisions are also made to score each depression of the index key 204 as an incorrect student answer. To this end, the associated pawl 210 has near its top a rear leg 274 with a shoulder 276 (FIG. 5), with this shoulder being led into operating engagement with the bar 240 on each rise of this pawl into register with the next tooth shoulder 220 on the ratchet wheel 212 pursuant to each depression of the index key 204. Thus, a student will not evade an incorrect answer score if he or she does not know which one of the given answers to a question on any displayed card is the correct one and, in consequence, manipulates the index key 204 rather than any of the registration keys 160. On the other hand, it is a simple matter to arrive at the true score of registered incorrect student answers to the questions in a deck of cards having besides question cards also introductory or explanatory cards requiring no student answer, by simply deducting from the indicated score the designated number of such introductory or explanatory cards in the deck.

The present teaching apparatus, while highly useful for individual student quizzing with insertable card decks, is also useful for simultaneously quizzing the students in a class by providing each student with a teaching apparatus without a deck of cards, and displaying by or under the control of a teacher or supervisor successive questions and given marked answers thereto of sufficiently large size to be readable by all students, with the students registering their selected answers to the questions, and the apparatus of each student indicating his or her incorrect-answer score at the end of a class quiz.

While in the described teaching apparatus the problem questions and answers thereto are given on cards of insertable decks, FIGS. 16 to 18 show a modified teaching apparatus 20a in which the problem questions and answers thereto are provided on successive frames f of an insertable film F, and these questions and answers are for their display projected on a screen 280 (FIG. 16). To this end, the modified apparatus 20a has a light source in the form of an electric bulb 282, a lens system 284, a film guide 286 with a window 288, a reflector 290, a film feed sprocket 292, and the screen 280 which is provided in a front opening 294 in a casing 296. Film F is insertable in the guide 286 at the open top thereof (FIG. 16), and is near the lower end of this guide 286 led over the feed sprocket 292 and directed into a channel 298 that leads to a collection chamber 300 which is open at the top for removal of a spent film (FIG. 17). The film sprocket 292, which is carried by a suitably journaled shaft 302, has a drive connection with the shaft 100a carrying the discs 178a' to 178d' and the ratchet wheel 212a, so that the sprocket 292 is turned to feed the film F the distance of one frame f in the direction of the arrow 304 (FIG. 18) on each indexing step of the shaft 100a pursuant to depression of a given one of the registration keys 160a' to 160d' or of the index key 204a. The drive connection between the film sprocket 292 and shaft 100a provides, in this instance, a pulley 306 on the sprocket shaft 302, a pair of pulleys 308 freely turnable on a fixed shaft 310, a pulley 312 on one of the companion members 314 of a friction coupling 316 the other member 318 of which is carried by the shaft 100a, and a belt 320 passed over the pulleys 306, 308 and 312 in the manner shown in FIGS. 17 and 18. The coupling member 314 is carried by a suitably journaled shaft 322, and the coupling members 314, 318 are normally held in frictional driving engagement with each other by spring-urged bolts 324 which act on a strap 326 that urges coupling member 318 against its companion member 314. The shaft 322 extends to the outside of the casing 296 and carries a hand wheel 328 with which to turn the coupling member 314 relative to its companion member 318 in operating the sprocket 292 to feed the leading end of inserted film F into the channel 298 and bring the first film frame f into register with the window 288 in the film guide 286 and, hence, also with the screen 280. To prevent rotation of the shaft 100a on the manual drive of the film sprocket 292 by the knob 328 for film registration as described, the shaft 100a is locked against rotation. To this end, the shaft 100a carries, in addition to the discs 178a' to 178d' and ratchet wheel 212a, a lock disc 330 having as many equiangularly spaced peripheral grooves 332 as there are shoulders on the discs 178a' to 178d', and a bar 334 having a tooth 336 and opposite end flanges 338 with which the bar is pivotally mounted on the fixed shaft 164a. The bar 334 spans the levers 162a and 206a associated with the registration keys 160a' to 160d' and with the index key 204a (FIG. 17), and this bar is by a spring 340 normally urged with its tooth 336 into locking register with any aligned groove 332 in the lock disc 330 (FIG. 18). However, while the bar 334 thus locks the shaft 100a against rotation on the manual drive of the film sprocket 292 by the knob 328, this bar is retracted from locking relation with the lock disc 330 on depression of any of the keys 160a' to 160d' or 204a into the dot-and-dash line position in FIG. 18 in the course of which its associated lever 162a or 206a is moved into the indicated dot-and-dash line position to engage the bottom edge of the bar and turn the latter into the retracted dot-and-dash line position, all as shown in FIG. 18. Accordingly, the bar 334 never interferes with the orderly indexing of the shaft 100a on depression of the respective keys 160a' to 160d' for correct-answer registrations or on each depression of the index key 204a. The present apparatus 20a thus performs in every respect in the same manner as the earlier described apparatus 20 of FIGS. 1 to 6, except that successive problem questions and the given answers thereto are projected onto a screen rather than by display of successive cards on which the answers and questions are printed. Further, in the present teaching apparatus, the distinguishing marks on the screen-projected answers to successive questions are also in preferred alignment with the registration keys 160a' to 160d' that bear the same marks (FIGS. 16 and 17). With this arrangement, the registration keys 160a' to 160b' are, by their alignment with the respective answers to each projected question, visibly associated with these answers on each projected question, wherefore neither the registration keys nor the answers to the projected questions need bear distinguishing marks, such as the exemplary triangle, square, cross and circle marks. Of course, the same holds for the teaching device 20 in FIGS. 1 to 6 on aligning the registration keys 160a to 160d with the answers to the question on each displayed card.

Cooperating with either teaching apparatus of FIGS. 1 to 6 or FIGS. 16 to 18 may be an audio device in the form of a battery-powered tape reproducer 350 (FIG. 7) holding a replaceable tape with recorded successive narrations relative to successive displayed problem questions, with the reproducer 350 starting and proceeding with the reproduction of each recorded narration on momentary closure of a normally open switch 352, and self-stopping at the end of each narration. For cooperation of such a reproducer with the teaching apparatus of FIG. 1 to 6, the switch 352 is coordinated with the ratchet wheel 212 (FIG. 7) so as to be momentarily closed by a tooth 214 thereof near the end of each indexing step of the shaft 100. Such a reproducer may also cooperate with the teaching device 20a of FIGS. 16 to 18 on similarly coordinating the switch 352 with the ratchet wheel 212a. Further, the latter teaching apparatus may also be provided with a compartment 326' for reception of a reproducer 350.

I claim:

1. Teaching apparatus, comprising a unit for insertion therein of a series of elements and operable to display successive elements, one for each operation, of an inserted series of which each element presents a problem question and a given number of answers thereto including one correct one; and a student-answer registering device providing individually manipulatable keys of said given number, coaxial discs associated with said keys, respectively, and turnable in unison, of which each disc has at least one shoulder and the shoulders of all discs are equiangularly spaced, with one shoulder being in a predetermined angular operating position, pawls associated with said keys, respectively, of which each pawl is on manipulation of the associated key moved to be in register with the shoulder on the associated disc if said shoulder is in said angular operating position, with any pawl registering with the shoulder on the associated disc indexing all discs through one step equal to the distance between successive shoulders, and means operating said unit on each indexing step of said discs to display a next element, whereby said unit is operated only on manipulation of any key which is in the order of the same key in a sequence of successive manipulations of said keys starting and recurring with a given key, with said sequence being as the programmed sequence of the discs whose shoulders follow each other into said operating position.

2. Teaching apparatus as in claim 1, in which the number of said keys is more than two.

3. Teaching apparatus as in claim 1, in which said shoulders are of a larger number than said keys.

4. Teaching apparatus as in claim 1, in which said pawls are in spring-urged follower relation with said discs and override said shoulders on turning said discs in said one direction relative to said pawls, and there is further provided a fixed pointer, and a manual knob turnable with said discs and provided with a marking, with said knob being turnable in said one direction for turning said discs in the same direction to bring said marking into alignment with said pointer, and said marking and pointer being coordinated so that on their alignment said keys are at the start of said manipulation sequence.

5. Teaching apparatus as in claim 4, in which said knob has as many equiangularly spaced different markings as there are shoulders on said discs, with successive ones of said markings being associated with said shoulders in the order in which they follow each other into said operating position, and said markings and pointer being coordinated so that on alignment of any marking with said pointer the associated shoulder is in said angular operating position, whereby a key manipulation sequence may be started on alignment of any of said markings with said pointer.

6. Teaching apparatus as in claim 1, which further provides mechanism operable to score each registered incorrect student answer, and means for operating said mechanism providing cam formations on said discs and including said pawls, with each pawl being on manipulation of its associated key diverted by the cam formation on the associated disc into operating relationship with said mechanism if the shoulder on the associated disc is out of said operating position.

7. Teaching apparatus as in claim 6, in which said mechanism provides a turnable ratchet disc with equiangularly spaced successive numbers starting with zero, a fixed pointer, and another pawl reciprocated by any of said diverted pawls to index said ratchet disc in one direction for aligning the next higher one of said numbers with said pointer.

8. Teaching apparatus as in claim 7, in which said ratchet disc is normally urged in a return direction opposite to said one direction, and there is further provided a fixed stop limiting return of said ratchet disc to a start position in which said zero number aligns with said pointer, a spring-urged holding pawl preventing return of said ratchet disc from any indexed position to said start position, and manual means for releasing said holding pawl from said ratchet disc for return of the latter to said start position.

9. Teaching apparatus as in claim 8, in which said unit includes a magazine having an open front and being otherwise closed for removable reception of an element series in the form of stacked printed cards of which each foremost card is displayed at said magazine front, and said manual pawl releasing means is provided in said magazine rearwardly spaced from said open front thereof so that access thereto is blocked by cards in said magazine.

10. Teaching apparatus as in claim 1, in which said keys are registration keys, and there is further provided a manipulatable index key, a wheel turnable with said discs and having equiangularly spaced teeth equal in number to said shoulders, and another pawl moved on each manipulation of said index key to register with a tooth on said wheel and index the latter and all discs in said one direction through one of said steps for operation of said unit without manipulation of a registration key.

11. Teaching apparatus as in claim 10, in which the pawls associated with the registration keys are first pawls, and there is further provided mechanism operable to score each registered incorrect student answer, first means for operating said mechanism providing cam formations on said discs and including said first pawls, with each of said first pawls being on manipulation of its associated registration key diverted by the cam formation on the associated disc into operating relation with said mechanism if the shoulder on the associated disc is out of said operating position, and other means for operating said mechanism providing cam portions on said wheel and including said other pawl, with said other pawl being on each manipulation of said index key also moved by a cam portion on said wheel into operating relation with said mechanism, whereby each manipulation of said index key is also scored as an incorrect student answer.

12. Teaching apparatus as in claim 1, in which said unit provides an open-front magazine for removable reception of an element series in the form of stacked printed cards with opposite edges and standing on one edge, with the foremost card being displayed at the magazine front, and said cards having in opposite edges notches of which the notches in successive cards are out of alignment and the notches in alternate cards are in alignment, a member movable into opposite positions and having at and within the confines of the open magazine front lugs retaining each forward card in, and permitting removal of the same from, the magazine front when in said opposite positions of said member said lugs are out of alignment and in alignment, respectively, with said notches in said foremost card, and means operable to move said member from either of said opposite positions to the other of said opposite positions.

13. Teaching apparatus as in claim 12, in which said lugs are arranged in pairs at the top and bottom, respectively, of the magazine front to cooperate with the notches at the top and bottom of cards standing with their bottom edges in the magazine.

14. Teaching apparatus as in claim 13, in which the lugs of one of said pairs are yieldable out of the confines of the open magazine front and have inclined front surfaces, whereby stacked cards are insertable into the magazine through the open front thereof by camming the lugs of said one pair at said inclined surfaces out of the confines of the open magazine front.

15. Teaching apparatus as in claim 1, in which said unit provides a film projector for removable reception of film with a series of successive answer and question frames, a screen on which to project the answer and question images from successive frames, a turnable film feed sprocket, and a drive connection between said discs and sprocket for operating the latter to index film one frame on each indexing step of said discs.

16. Teaching apparatus as in claim 15, in which said drive connection includes a friction coupling having companion members of which one member turns with said discs and the other member turns with said sprocket, and there is further provided a knob turning with said other member and turnable to drive said sprocket relative to said discs for bringing film into register with said screen.

17. Teaching apparatus as in claim 16, which further provides means normally locking said discs against rotation and operable by any of said keys on its manipulation to release said discs for one of said indexing steps.

18. Teaching apparatus as in claim 17, in which said locking means provides a disc part turning with said discs and having in its periphery equiangularly spaced grooves equal to the number of said shoulders, and a key part turnable about a fixed pivot into and from locking register with any aligned one of said grooves and normally spring-urged into locking register therewith, with said key part having a shoulder engaged by any of said keys on its manipulation for turning said key part from locking register with any of said grooves.

19. Teaching apparatus as in claim 1, having provisions for visually associating said keys with the respective answers to the question on each displayed element.

20. Teaching apparatus as in claim 19, in which said provisions are different distinguishing marks on said keys corresponding to the same marks on the respective answers to the question on each displayed element.